United States Patent
Tripathy

(10) Patent No.: US 11,746,434 B2
(45) Date of Patent: Sep. 5, 2023

(54) METHODS OF FORMING A METAL COATED ARTICLE

(71) Applicant: Battelle Energy Alliance, LLC, Idaho Falls, ID (US)

(72) Inventor: Prabhat K. Tripathy, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/813,920

(22) Filed: Jul. 20, 2022

(65) Prior Publication Data
US 2023/0047624 A1    Feb. 16, 2023

Related U.S. Application Data

(60) Provisional application No. 63/203,398, filed on Jul. 21, 2021.

(51) Int. Cl.
| | | |
|---|---|---|
| C25D 3/66 | (2006.01) |
| C25D 5/10 | (2006.01) |
| C25D 11/00 | (2006.01) |
| C25D 5/50 | (2006.01) |

(52) U.S. Cl.
CPC .............. C25D 3/665 (2013.01); C25D 5/10 (2013.01); C25D 5/50 (2013.01); C25D 11/00 (2013.01)

(58) Field of Classification Search
None
See application file for complete search history.

(56) References Cited

U.S. PATENT DOCUMENTS

| | | |
|---|---|---|
| 2,373,320 A | 4/1945 | Lovell et al. |
| 2,510,128 A | 6/1950 | Miner et al. |
| 2,762,764 A | 9/1956 | Owen |
| 3,267,008 A | 8/1966 | Smith et al. |
| 3,268,422 A | 8/1966 | Smith et al. |
| 4,146,438 A | 3/1979 | De et al. |
| 4,995,948 A | 2/1991 | Poa et al. |

(Continued)

FOREIGN PATENT DOCUMENTS

| | | |
|---|---|---|
| CN | 102766891 A | 11/2012 |
| CN | 103397357 A | 11/2013 |

(Continued)

OTHER PUBLICATIONS

Machine translation of Isiyama et al. JP 2014081211 A) (Year: 2014).*

(Continued)

*Primary Examiner* — Wojciech Haske
(74) *Attorney, Agent, or Firm* — TraskBritt

(57) ABSTRACT

A method of forming a metal coated article, comprises forming a metal halide in a molten salt plating bath at a first temperature, wherein forming the metal halide in the molten salt further comprises forming at least one functional metal halide electrolyte; and forming at least two auxiliary metal halide electrolytes at eutectic conditions; increasing the first temperature to a second temperature; forming a plated metal coating from the at least one functional metal halide electrolyte onto a thermally conductive substrate; and introducing at least one of deuterium and tritium into the plated metal coating.

20 Claims, 2 Drawing Sheets

(56) References Cited

U.S. PATENT DOCUMENTS

| | | | |
|---|---|---|---|
| 5,006,420 | A | 4/1991 | Watanabe et al. |
| 5,242,563 | A | 9/1993 | Stern et al. |
| 5,909,156 | A | 6/1999 | Nishihara et al. |
| 2004/0262163 | A1 | 12/2004 | Nitta et al. |
| 2006/0154084 | A1 | 7/2006 | Schuh et al. |
| 2009/0301886 | A1 | 12/2009 | Hoshi et al. |
| 2011/0220511 | A1 | 9/2011 | Dadvand et al. |
| 2015/0132602 | A1 | 5/2015 | Sun et al. |
| 2015/0136209 | A1 | 5/2015 | Hattori et al. |
| 2017/0018361 | A1 | 1/2017 | Nishisaka |
| 2017/0170436 | A1 | 6/2017 | Ibaragi et al. |
| 2018/0209057 | A1 | 7/2018 | Tripathy et al. |

FOREIGN PATENT DOCUMENTS

| | | | |
|---|---|---|---|
| JP | 2004-035911 A | | 2/2004 |
| JP | 2013-248645 A | | 12/2013 |
| JP | 2014081211 A | * | 5/2014 |

OTHER PUBLICATIONS

Marchese et al. "New generation non-stationary portable neutron generators for biophysical applications of Neutron Activation Analysis" Biochimica et Biophysica Acta 1861 (2017) 3661-3670, Accepted May 15, 2016.

Shukla et al. "Titanium Hydride targets for Portable Neutron Generator applications" Barc Newsletter Nov.-Dec. 2020, Issue No. 370, ISSN: 0976-2108, 39 pages.

Xue et al. "Surface Modification Techniques of Titanium and its Alloys to Functionally Optimize Their Biomedical Properties: Thematic Review" Frontiers in Bioengineering and Biotechnology, vol. 8: Article 603072 (Nov. 2020) 19 pages.

Alpay, N., et al., "Anodized aluminum-silicon alloy counter electrode substrates for next generation solar cell applications," Applied Surface Science, vol. 356, Nov. 30, 2015, pp. 317-324.

Ekambaram, et al. "Synthesis and Characterization of Aluminum Alloy AA6061-Alumina Metal Matrix Composite", Sep. 26, 2015, International Journal of Current Engineering and Technology, vol. 5, pp. 3211-3216 (Year: 2015).

Galopin, et al., "Molten Salts in Metal Treating: Present Uses and Future Trends," Electrodeposition and Surface Treatment, vol. 3, pp. 1-31 (1975).

International Search Report for International Application No. PCT/US16/42528, dated Nov. 1, 2016, 2 pages.

International Written Opinion for International Application No. PCT/US16/42528, dated Nov. 1, 2016, 6 pages.

Ku, Z., et al., "A mesoporous nickel counter electrode for printable and reusable perovskite solar cells," Nanoscale, vol. 7, 2015, pp. 13363-13368.

Tripathy et al., "Evaluation of Alkali Bromide Salts for Potential Pyrochemical Applications", Idaho National Laboratory, Global 2013, Salt Lake City, Utah, pp. 867-873.

Tripathy, P.K., "Aluminium Electroplating on Steel from a Fused Bromide Electrolyte," Surface and Coatings Technology, vol. 258, Aug. 1, 2014, pp. 52.

Zhao, J., et al., "Is Cu a Stable Electrode Material in Hybrid Perovskite Solar Cells for a 30-Year Lifetime?," Energy & Environmental Science, vol. 9, No. 12, Dec. 2016, pp. 1-8.

\* cited by examiner

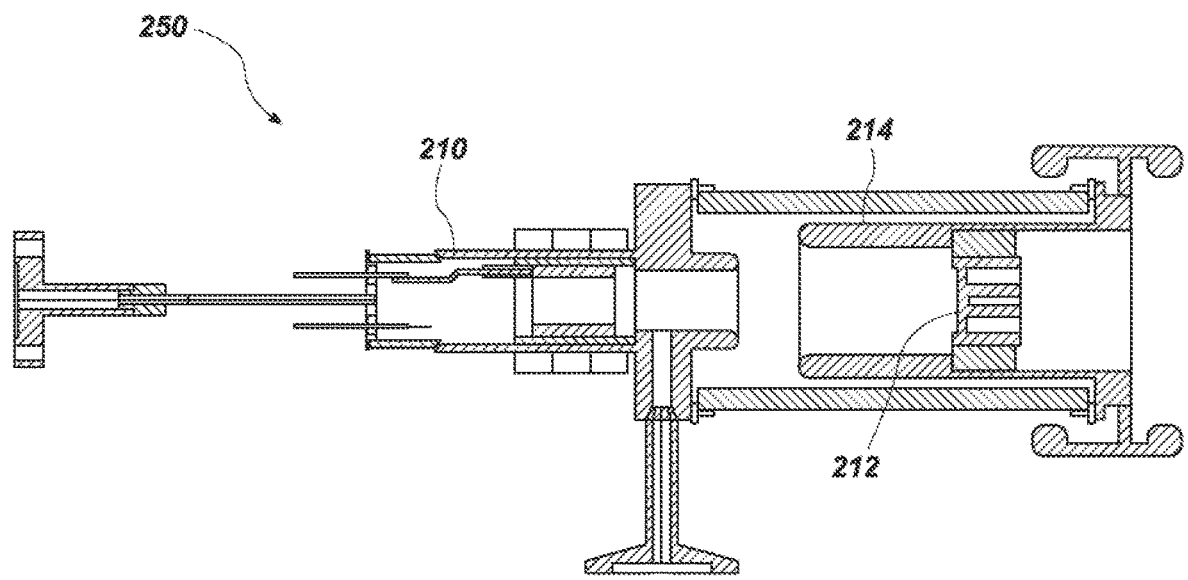
FIG. 2
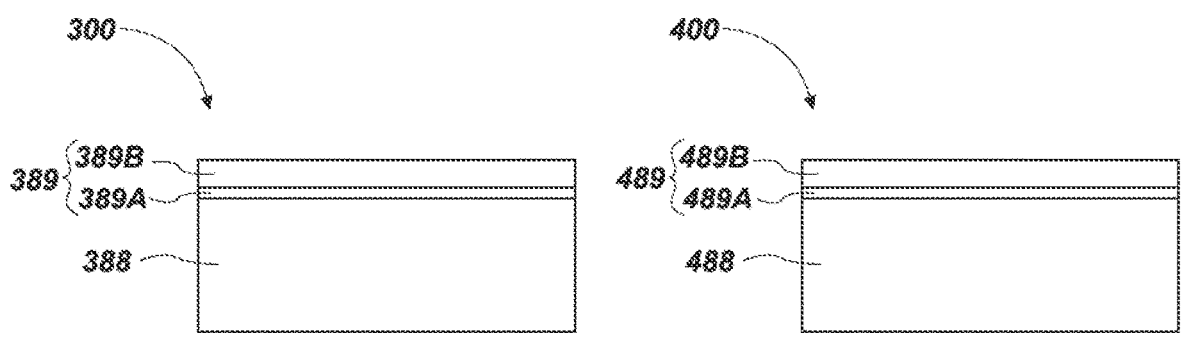
FIG. 3
FIG. 4

METHODS OF FORMING A METAL COATED ARTICLE

CROSS-REFERENCE TO RELATED APPLICATION

This application claims the benefit under 35 U.S.C. § 119(e) of U.S. Provisional Patent Application Ser. No. 63/203,398, filed Jul. 21, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The disclosure relates generally to molten salt electrochemistry. More specifically, the disclosure relates to electroplating, from a molten salt bath, a metallic material onto a conductive substrate to form a coated article, and to introducing at least one of deuterium and tritium into the metallic material.

BACKGROUND

Among subatomic particles, neutrons are employed, in imaging techniques to materials characterization, from geological field to electronics (device testing), in nondestructive methods, and in research activities. Neutrons provide many advantages in the study of the structure and dynamics of biological samples as these systems have a high hydrogen content and so neutrons allow the visualization of hydrogen atoms. For solution structures of macromolecular complexes that often cannot be crystallized for structure determination, neutron scattering provides the advantage of recording contrast variation by changing the isotopic composition of both a solvent and individual macromolecular components. More specifically, neutrons can be used as a highly effective probing tool for biological systems at atomic and molecular levels.

Traditionally, nuclear reactors have been the sources for neutron beams. In the last fifty years or so, the technology has advanced to a stage where portable neutron generators (PNGs) are increasingly being used in almost all areas of modern technologies: detection of nuclear, explosive, or narcotics materials, oil well logging, mineral exploration, coal analysis for power plants and materials characterization. In fact, PNGs have emerged as useful alternatives to nuclear reactors for many industrial applications.

One of the most popular types of PNGs is based on the light-ion accelerator type, and is a compact and hermetically sealed device that contains (1) a source (able to generate positively charged ions, often a Penning source), (2) a direct current (DC) ion accelerator, (3) a neutron producing metal hydride target containing deuterium, tritium, or both, and (4) a gas-control reservoir, also made of a metal hydride material. The interaction of an accelerated deuterium/tritium beam with the metal hydride target produces energetic neutrons through deuterium-deuterium and deuterium-tritium type fission reactions.

The metal hydride target includes a few-microns thick metallic film, deposited on a metallic substrate of high thermal conductivity. This film is then exposed to deuterium/tritium gas, forming an active metal hydride neutron producing layer. In order to get a stable neutron output in a neutron generator, the neutron producing target should possess a combination of properties: high thermal stability, high hydrogen isotope storage capacity, mechanical stability under energetic particle interactions, high heat conductivity, and the ease of fabrication.

Metal hydride targets have been fabricated by a number of vapor deposition processes, including physical vapor deposition techniques, such as direct current/radio frequency sputtering techniques utilized to form metallic thin films. Alternatively, a thermal vapor deposition method technique has been employed to deposit a relatively thicker (~3.5 micron) film on oxygen-free high-conductivity copper (OFHC). In this technique, a tungsten filament is used to transport the titanium vapors from the source (titanium wire) to the substrate at a temperature of ~1800° C. and the film is formed within a few hours.

Portable neutron generators utilize a metal hydride target which contains deuterium and tritium stored as a hydride compound. The target substrate may be oxygen-free high-conductivity copper. A number of metals and alloys, which are good hydride formers, may be used to form thin films/coatings on the copper substrate. These include lithium, titanium, zirconium, hafnium, vanadium, niobium, lanthanum, yttrium, neodymium, thorium and alloys. From among these, titanium has been used because of a combination of advantageous features this metal offers: a high hydrogen storage capacity (hydrogen-to-titanium ratio being 2, which gives a high neutron yield), high temperature stability and comparatively less expensive. However, development of titanium getter films (along with other metal getter films) on an OFHC substrate offers technological challenges.

BRIEF SUMMARY

Embodiments of the disclosure disclosed and taught herein are directed to a method of forming a metal-coated article, comprising forming a metal halide in a molten salt plating bath at a first temperature, wherein forming the metal halide in the molten salt further comprises forming at least one functional metal halide electrolyte; and forming at least two auxiliary metal halide electrolytes at eutectic conditions; increasing the first temperature to a second temperature; forming a plated metal coating from the at least one functional metal halide electrolyte, onto a thermally conductive substrate; and introducing at least one of deuterium and tritium into the plated metal coating.

Also disclosed is a method of forming a metal coated article comprising plating a metal onto a thermally conductive substrate to form a plated metal coating on the thermally conductive substrate, the thermally conductive substrate selected from the group consisting of oxygen free high conductivity (OFHC) copper, silver, aluminum, and nickel; wherein plating the metal further comprises plating from a molten salt plating bath further comprising: a ternary metal halide auxiliary electrolyte eutectic composition including lithium, potassium and cesium salts; and at least one metal halide functional electrolyte consisting of $TiBr_4$, $TiI_4$, $TiF_4$, $ZrBr_4$, $ZrI_4$, $ZrF_4$, $HfBr_4$, $HfI_4$, $HfF_4$, $VBr_3$, $VI_3$, $VF_3$, $NbBr_5$, $NbI_5$, $NbF_5$, $LaBr_3$, $LaI_3$, $LaF_3$, $YBr_3$, $YI_3$, $YF_3$, $NdBr_3$, $NdI_3$, $NdF_3$, $ThBr_4$, $ThI_4$, $ThF_4$, $PdBr_2$, $PdF_2$, and $PdI_2$; cleaning the plated metal coating to remove at least some halides; annealing the plated metal coating to achieve at least one of: altering grain morphology of the plated metal coating; and decreasing porosity of the plated metal coating; and introducing at least one of deuterium and tritium into the plated metal coating.

Also disclosed is a method of forming a metal coated article comprising forming a metal oxide on a thermally conductive substrate; reducing the metal oxide to a metal coating under conditions comprising a temperature from about 700° C. to about 900° C. in the presence of hydrogen gas; applying a reducing potential to the thermally conductive substrate within a calcium chloride salt bath in a range from about 2.5 volts cathodic and about 3.1 volts cathodic relative to a reference electrode; annealing the metal coating in an inert atmosphere at a temperature of between about 500° C. and about 600° C.; and introducing at least one of deuterium and tritium into the metal coating.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

FIG. 2 depicts a portable neutron generator including a coated article in accordance with one or more embodiments of the present disclosure;

FIG. 3 depicts a coated article with a cross-section elevation of a substrate and a coating in accordance with one or more embodiments of the present disclosure; and FIG. 4 depicts a coated article with a cross-section elevation of a substrate and a coating in accordance with one or more embodiments of the present disclosure.

DETAILED DESCRIPTION

Figure 1:
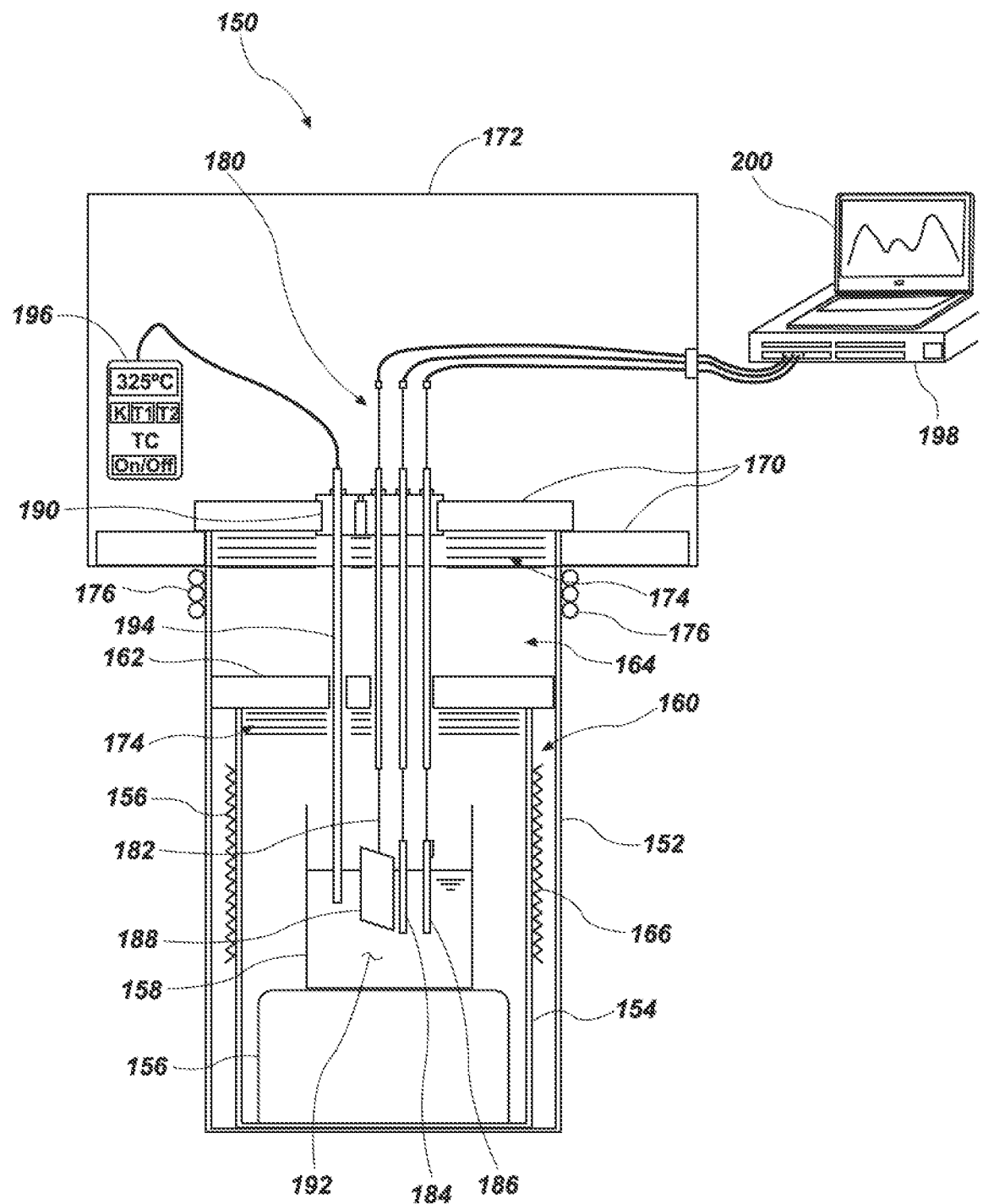
FIG. 1 depicts a system for coating or plating an article with a metal in accordance with one or more embodiments of the present disclosure.

A variety of methods is disclosed to coat articles with a metal or a metal alloy. Economical and efficient methods of manufacture of metal coated articles are disclosed. The metal coated article may, for example, be a neutron-generating article, such as a component of a portable neutron generator (PNG). An electrolytic coating process (also known as electroplating) may be used to form (e.g., deposit) high-quality, smooth, well-adhered, and relatively thicker metallic films (e.g., metallic coatings) on a variety of substrate materials (e.g., substrates). The process utilizes a combination of an alkali/alkaline earth metal-based molten salt electrolyte (e.g., an auxiliary electrolyte) and a functional electrolyte (of the metal ion of interest) to coat the substrate at a temperature of less than about 500° C., such as less than about 450° C. The functional electrolyte functions as a source of the metal or metals to be deposited as the plated metal coating. The auxiliary electrolyte provides both a thermodynamic and kinetic chemical pathway, through which the functional electrolyte may pass to be deposited upon a cathode of an electrode assembly. The auxiliary electrolyte and the functional electrolyte are used as halide electrolyte components of a salt melt, which may be referred to as a molten salt plating bath during plating conditions. The disclosed method is relatively inexpensive, simple, and capable of depositing metal and metal alloy coatings onto simple or complex geometry substrates, allows for ready control of film thickness, avoids oxygen contamination in the film, and uses straightforward post-coating treatments. The disclosed method offers uniform surface coverage, is effectuated at relatively low temperatures compared with conventional physical and chemical vapor deposition techniques, uses economical salts as feedstocks, uses inexpensive equipment, and is readily scalable.

The electrolytic coating process may be used to deposit (e.g., plate) a metal material onto a thermally conductive substrate, such as onto a metal substrate, thereby forming a coated component (e.g., the coated article). The substrate may be capable of being subjected to temperatures of the molten salt plating bath. The thermally conductive substrate may include, but is not limited to, one of copper, silver, nickel, aluminum, carbon steel, stainless steel, or brass. The thermally conductive substrate may, for example, be carbon steel, stainless steel, or brass. The plated material may be a metal, such as lithium, titanium, zirconium, hafnium, vanadium, niobium, lanthanide, yttrium, neodymium, thorium, palladium, a combination of one or more of the metals, or an alloy of one or more of the metals. The plated material may be a codeposited alloy that forms a plated metal coating, and the plated metal coating may include two or more of the metals. Plating according to embodiments of the disclosure achieves useful coverage of the metal on the substrate for use such as for a portable neutron generator. The plating method may be performed in an inert atmosphere, e.g., argon. The use of the inert atmosphere allows the material of the plated metal coating to cool after deposition without getting oxidized. The plating method according to embodiments of the disclosure also avoids the high temperature, low pressure processes conventionally used to prepare metal coatings on components, such as targets and reservoirs, for portable neutron generators.

Plating according to embodiments of the disclosure uses the molten salt plating bath (e.g., a salt melt under metallic plating conditions). The molten salt plating bath may include the auxiliary electrolyte and the functional electrolyte. For example, the auxiliary electrolyte may comprise one or more metal salts, such as a metal halide or a combination of metal halides. The auxiliary electrolyte may be formed (e.g., mixed) at a first temperature such that eutectic conditions of an auxiliary electrolyte mixture is formed, and then reduced to a lower temperature before adding the functional electrolyte, which contains a salt of the metal to be formed (e.g., plated) on the substrate. The metal of the functional electrolyte may be an alkali metal, a transition metal, a lanthanide, an actinide, a rare earth metal, or a combination thereof. Using the eutectic mixture that forms the auxiliary electrolyte, with the functional electrolyte, may allow plating at a lower temperature than that which may be used to form a molten salt plating bath from a single auxiliary electrolyte alone. The final plating temperature may be a function of the melting point of the functional electrolyte within the conditions of the eutectic mixture of auxiliary electrolytes. In addition, the molten salt plating bath temperature may be adjusted to control the viscosity of the salt melt. The molten salt plating bath may be used to plate a metal coating on a thermally conductive substrate. The metal coating may be used to store deuterium or tritium, or both on the thermally conductive substrate for use by a portable neutron generator (PNG).

The following description provides specific details, such as material compositions and processing conditions (e.g., temperatures, current densities, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., valves, temperature detectors, flow detectors, pressure detectors, and the like) are inherently disclosed herein and that adding various conventional process components and acts would be in accord with the disclosure.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figure. Unless otherwise specified, the spatially relative terms are intended to encompass different orientations of the materials in addition to the orientation depicted in the figure. For example, if materials in the figure are inverted, elements described as "below" or "beneath" or "under" or "on bottom of" other elements or features would then be oriented "above" or "on top of" the other elements or features. Thus, the term "below" may encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "substantially all" means and includes greater than about 95%, such as greater than about 99%.

As used herein, the term "about" in reference to a numerical value for a particular parameter is inclusive of the numerical value and a degree of variance from the numerical value that one of ordinary skill in the art would understand is within acceptable tolerances for the particular parameter. For example, "about" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof.

As used herein, the term "may" with respect to a material, structure, feature or method act indicates that such is contemplated for use in implementation of some embodiments of the disclosure and such term is used in preference to the more restrictive term "is" so as to avoid any implication that other, compatible materials, structures, features and methods usable in combination therewith should or must be excluded.

As used herein, the term "anode" and its grammatical equivalents means and includes an electrode where oxidation takes place.

As used herein, the term "cathode" and its grammatical equivalents means and includes an electrode where reduction takes place.

The illustrations presented herein are not meant to be actual views of any particular setup, or related method, but are merely idealized representations, which are employed to describe example embodiments of the present disclosure. The figures are not necessarily drawn to scale. Additionally, elements common between figures may retain the same numerical designation.

A molten salt plating bath is a salt melt within electroplating conditions, where the molten salt plating bath includes the auxiliary electrolyte and the functional electrolyte. A working electrode (e.g., the cathode) of the electrode assembly, which is attached to an article (e.g., the substrate) to be plated, is in contact with the salt melt under molten salt plating bath conditions. The electrode assembly includes a counter electrode that provides a current connection for the current applied to the working electrode. The electrode assembly may also include a reference electrode and a thermocouple or other device for measuring the temperature of the salt melt under molten salt plating bath conditions.

The salt melt may comprise a combination of metal halides, such as metal bromides, metal iodides, or metal fluorides. The salt melt may exclude metal chlorides, as metal chloride salts may have the tendency to decompose in the salt melt. The metal chlorides may be used, however, as halides for auxiliary electrolytes. The metal halides may comprise one or more metal bromides, one or more metal iodides, and/or one or more metal fluorides. The salt melt may, for example, include a ternary bromide auxiliary electrolyte composition such as potassium bromide (KBr), lithium bromide (LiBr), and cesium bromide (CsBr). For example, for zirconium plating, the salt melt may include zirconium bromide ($ZrBr_4$) as the functional electrolyte and a combination of potassium bromide, lithium bromide, and cesium bromide as the auxiliary electrolyte. The salt melt may include, as the functional electrolyte, a metal bromide, a metal iodide, and/or a metal fluoride, where the metal of the functional electrolyte is the metal to be plated from the molten salt plating bath and onto the thermally conductive substrate. For example, titanium bromide ($TiBr_4$) may be used as the functional electrolyte to plate titanium on the thermally conductive substrate or zirconium iodide may be used as the functional electrolyte to plate zirconium on the substrate thermally conductive.

As an alternative to preparing an all bromide salt melt composition such as LiBr—KBr—CsBr as the auxiliary electrolyte, an all iodide auxiliary electrolyte salt melt (LiI—KI—CsI) may be used in connection with a titanium iodide ($TiI_4$) functional electrolyte, to prepare, e.g., Ti-coated components on a variety of substrate materials. Like the all bromide auxiliary electrolyte salt melts, the all iodide auxiliary electrolyte salt melts also may be used in a low-temperature (e.g., below about 450° C.) plated metal coating process. A combination of the components of the bromide and iodide auxiliary electrolyte salt melts may be used, such as, for example, one combination of LiBr—KI—CsBr, LiI—KI—CsBr, LiBr—KBr—KI, etc. The combination of iodides and bromides provides a variety of potential auxiliary electrolyte compositions which may be used with the functional electrolyte to plate any of the described metals. For example with a combination of bromide and iodide auxiliary electrolytes, the functional electrolyte may include at least one $TiBr_4$, $TiI_4$, $TiF_4$, $ZrBr_4$, $ZrI_4$, $ZrF_4$, $HfBr_4$, $VBr_3$, $NbBr_5$, $LaBr_3$, $YBr_3$, $NdBr_3$, or $ThBr_4$.

Prior to plating, the thermally conductive substrate to be plated is cleaned and then attached (e.g., electrically connected) to the working electrode (e.g., the cathode) of the electrode assembly and placed in the molten salt plating bath. Current from a power source is applied to the cathode to produce a negative charge on the cathode. The negative charge combines with the positively charged metal ions in the molten salt plating bath to form the plated metal coating from the salt melt onto the thermally conductive substrate. The current may be applied for from about 30 minutes to about 120 minutes, although other times may be used depending on the desired thickness of the plated coating. Longer times are associated with thicker plating on the substrate. The thickness of the plating may be proportional to the plating time.

The functional electrolyte may make up a portion of a volume of the salt melt, such as in a range from about 60 weight percent (wt. %) to about 90 wt. %. In some embodiments, the functional electrolyte makes up from at least about 60 wt. % to about 80 wt. % of the salt melt. The auxiliary electrolyte may account for from about 10 wt. % to about 40 wt. % of the salt melt. The salt melt may, for example, include only the auxiliary electrolyte and the functional electrolyte.

Ternary metal halide auxiliary electrolytes may be combined with a single metal halide functional electrolyte, or the ternary metal halide auxiliary electrolytes may be combined with binary metal halide functional electrolytes (up to two metal halide functional electrolytes) for a molten salt plating bath to form a metallic plated article such as for a PNG plated article. The ternary metal halide auxiliary electrolytes may be provided as three-metal components, with two-halide salt reactants, such as lithium potassium cesium metal components and bromine and iodine salt reactants. Such three-metal components with two-halide reactant (e.g., Br and I) compositions may include salt melts, such as, for example, LiBr—KI—CsBr, LiI—KI—CsBr, LiBr—KBr—KI, etc. The combination of iodides and bromides provides a variety of potential auxiliary electrolyte compositions which may be used with the functional electrolyte to plate any of the described metals. For example, the functional electrolyte may include $TiBr_4$, $TiI_4$, $TiF_4$, $ZrBr_4$, $ZrI_4$, $ZrF_4$, $HfBr_4$, $VBr_3$, $NbBr_5$, $LaBr_3$, $YBr_3$, $NdBr_3$, or $ThBr_4$. Similarly, ternary metal halide auxiliary electrolytes may be derived from bromine-fluorine binary auxiliary electrolytes, such as, for example, LiBr—KF—CsBr, LiF—KF—CsBr, LiBr—KBr—KF, etc. Similarly, ternary metal halide auxiliary electrolytes may be derived from fluorine-iodine binary auxiliary electrolytes, such as, for example, LiF—KI—CsF, LiI—KI—CsF, LiF—KF—KI, etc.

In a first group of ternary metal halide auxiliary electrolytes, up to two metal halide functional electrolytes are combined, including titanium fluoride and titanium iodide to form a plated metal coating of a metallic plated article (also referred to as a coated article).

In some embodiments, a titanium plating method is employed in a molten salt plating bath, with a functional electrolyte to form a metallic plated article, including either $TiF_4$ or $TiI_4$, in a range from about 60 wt. % to about 80 wt. % of the total salt melt, and the auxiliary electrolyte includes ternary alkali/alkaline earth metal halides that includes lithium fluoride, potassium iodide, and cesium iodide in a range from about 20 wt. % to about 40 wt. % of the total salt melt. In some embodiments, a titanium plating method is employed in a molten salt plating bath, with a functional electrolyte including a combination of $TiF_4$ and $TiI_4$ to form a metallic plated article, in a range from about 60 wt. % to about 80 wt. % of the total salt melt, and the auxiliary electrolyte includes ternary alkali/alkaline earth metal halides that includes lithium fluoride, potassium iodide, and cesium iodide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiF_4$ or $TiI_4$ to form a metallic plated article, in a range from about 60 wt. % to about 80 wt. % of the total salt melt, and the auxiliary electrolyte includes ternary alkali/alkaline earth metal halides that includes lithium fluoride, potassium fluoride, and cesium iodide in a range from about 20 wt. % to about 40 wt. % of the total salt melt. In some embodiments, a titanium plating method is employed in a molten salt plating bath, with a functional electrolyte based upon a combination of $TiF_4$ and $TiI_4$ to form a metallic plated article, in a range from about 60 wt. % to about 80 wt. % of the total salt melt, and the auxiliary electrolyte includes ternary alkali/alkaline earth metal halides that includes lithium fluoride, potassium fluoride, and cesium iodide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed with a functional electrolyte, based upon either $TiF_4$ or $TiI_4$ to form a metallic plated article, in a range from about 60 wt. % to about 80 wt. % of the total salt melt, and the auxiliary electrolyte includes ternary alkali/alkaline earth metal halides that includes lithium fluoride, potassium iodide, and cesium fluoride in a range from about 20 wt. % to about 40 wt. % of the total salt melt. In some embodiments, a titanium plating method is employed with a functional electrolyte based upon a combination of $TiF_4$ and $TiI_4$ to form a metallic plated article, in a range from about 50 wt. % to about 80 wt. % of the total salt melt, and the auxiliary electrolyte includes ternary alkali/alkaline earth metal halides that includes lithium fluoride, potassium iodide, and cesium fluoride in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed with a functional electrolyte, based upon either $TiF_4$ or $TiI_4$ to form a metallic plated article, in a range from about 50 wt. % to about 80 wt. % of the total salt melt, and the auxiliary electrolyte includes ternary alkali/alkaline earth metal halides that includes lithium iodide, potassium iodide, and cesium fluoride in a range from about 20 wt. % to about 40 wt. % of the total salt melt. In some embodiments, a titanium plating method is employed with a functional electrolyte based upon a combination of $TiF_4$ and $TiI_4$ to form a metallic plated article, in a range from about 60 wt. % to about 80 wt. % of the total salt melt, and the auxiliary electrolyte includes ternary alkali/alkaline earth metal halides that includes lithium iodide, potassium iodide, and cesium fluoride in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In a second group of ternary metal halide auxiliary electrolytes, up to two metal halide functional electrolytes are combined, including titanium fluoride and titanium bromide.

In some embodiments, a titanium plating method is employed in a molten salt plating bath, with a functional electrolyte, based upon either $TiF_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium bromide, and cesium bromide in a range from about 20 wt. % to about 40 wt. % of the total salt melt. In some embodiments, a titanium plating method is employed in a molten salt plating bath, with a functional electrolyte, based upon a combination of $TiF_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium bromide, and cesium bromide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiF_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium fluoride, and cesium bromide in a range from about 20 wt. % to about 40 wt. % of the total salt melt. In some embodiments, a titanium plating method is employed in a molten salt plating bath, with a functional electrolyte, based upon a combination of $TiF_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium fluoride, and cesium bromide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiF_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium bromide, and cesium fluoride in a range from about 20 wt. % to about 40 wt. % of the total salt melt. In some embodiments, a titanium plating method is employed in a molten salt plating bath, with a functional electrolyte, based upon a combination of $TiF_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium fluoride, potassium bromide, and cesium fluoride in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiF_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium bromide, potassium bromide, and cesium fluoride in a range from about 20 wt. % to about 40 wt. % of the total salt melt. In some embodiments, a titanium plating method is employed in a molten salt plating bath, with a functional electrolyte, based upon a combination of $TiF_4$ and $TiBr_4$ to form a metallic plated article, in a range from about 50 wt. % to about 80 wt. % of the total salt melt, and the auxiliary electrolyte includes ternary alkali/alkaline earth metal halides that includes lithium bromide, potassium bromide, and cesium fluoride in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In a third group of ternary metal halide auxiliary electrolytes, up to two metal halide functional electrolytes are combined, including titanium iodide and titanium bromide to form a metallic plated article.

In some embodiments, a titanium plating method is employed in a molten salt plating bath, with a functional electrolyte, based upon either $TiI_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium bromide, and cesium bromide in a range from about 20 wt. % to about 40 wt. % of the total salt melt. In some embodiments, a titanium plating method is employed in a molten salt plating bath, with a functional electrolyte, based upon a combination of $TiI_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium bromide, and cesium bromide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiI_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium bromide, and cesium iodide in a range from about 20 wt. % to about 40 wt. % of the total salt melt. In some embodiments, a titanium plating method is employed in a molten salt plating bath, with a functional electrolyte, based upon a combination of $TiI_4$ $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium bromide, and cesium iodide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiI_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium iodide, and cesium bromide in a range from about 20 wt. % to about 40 wt. % of the total salt melt. In some embodiments, a titanium plating method is employed in a molten salt plating bath, with a functional electrolyte, based upon a combination of $TiI_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium iodide, potassium iodide, and cesium bromide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiI_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium bromide, potassium iodide, and cesium iodide in a range from about 20 wt. % to about 40 wt. % of the total salt melt. In some embodiments, a titanium plating method is employed in a molten salt plating bath, with a functional electrolyte, based upon a combination of $TiI_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium bromide, potassium iodide, and cesium iodide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

In some embodiments, a titanium plating method is employed in a molten salt plating bath, with a functional electrolyte, based upon either $TiI_4$ or $TiBr_4$ to form a metallic plated article, in a range from about 60 wt. % to about 80 wt. % of the total salt melt, and the auxiliary electrolyte includes ternary alkali/alkaline earth metal halides that includes lithium bromide, potassium bromide, and cesium iodide in a range from about 20 wt. % to about 40 wt. % of the total salt melt. In some embodiments, a titanium plating method is employed in a molten salt plating bath, with a functional electrolyte, based upon a combination of $TiI_4$ and $TiBr_4$ to form a metallic plated article, in a range from about 60 wt. % to about 80 wt. % of the total salt melt, and the auxiliary electrolyte includes ternary alkali/alkaline earth metal halides that includes lithium bromide, potassium bromide, and cesium iodide in a range from about 20 wt. % to about 40 wt. % of the total salt melt. In some examples of the two forgoing embodiments, the functional electrolyte is about 81.5 wt. % of the salt melt, and the auxiliary electrolyte is about 18.5 wt. %.

Binary-metal functional electrolytes may be used in any of the above articulated embodiments where the binary-metal functional electrolytes are established with a single halide, such as $TiF_4$ and $ZrF_4$, or with a binary halide such as $TiBr_4$ and $ZrI_4$ to form a plated metal coating of a metallic plated article. Examples of binary-metal functional electrolytes are set forth herein. In some embodiments, the material of a plated metal coating of a metallic plated article, is derived from a functional electrolyte in a ternary metal halide auxiliary electrolyte molten salt plating bath, to form a metallic plated article, that includes formation from binary halide salts of titanium and zirconium. The binary metal halide functional electrolyte may result in a solid solution plated material of $Ti_xZr_y$, where the ratios of x to y are in a titanium-lean solid solution with zirconium. A titanium-lean solid solution with zirconium, means a non-stoichiometric ratio of titanium and zirconium with less titanium than zirconium. In some embodiments, a $Ti_xZr_y$ composition is plated where x to y ratios are in a stoichiometric alloyed ratio of titanium with zirconium. In some embodiments, a $Ti_xZr_y$ composition is plated where x to y ratios are in a titanium-rich solid solution with zirconium. A titanium-rich solid solution with zirconium, means a non-stoichiometric ratio of titanium and zirconium with more titanium than zirconium. In some embodiments, the solid-solution ratios are y=4, and x is in a range from about 0.5 to about 2.

In some embodiments, the material of a plated metal coating of a metallic plated article, is derived from a functional electrolyte in a ternary metal halide auxiliary electrolyte molten salt plating bath, to form a metallic plated article, that includes formation from binary halide salts of titanium and lanthanum. The binary metal halide functional electrolyte may result in a solid solution plated material of $Ti_xLa_y$, where the ratios of x to y are in a titanium-lean solid solution with lanthanum. A titanium-lean solid solution with lanthanum, means a non-stoichiometric ratio of titanium and lanthanum, with less titanium than lanthanum. In some embodiments, a $Ti_xLa_y$ composition is plated where x to y ratios are in a stoichiometric alloyed ratio of titanium with lanthanum. In some embodiments, a $Ti_xLa_y$ composition is plated where x to y ratios are in a titanium-rich solid solution with lanthanum. A titanium-rich solid solution with lanthanum, means a non-stoichiometric ratio of titanium and lanthanum, with more titanium than lanthanum. In some embodiments, the solid-solution ratios are y=4, and x is in a range from about 0.5 to about 2.

In some embodiments, the material of a plated metal coating of a metallic plated article, is derived from a functional electrolyte in a ternary metal halide auxiliary electrolyte molten salt plating bath, to form a metallic plated article, that includes formation from binary halide salts of zirconium and lanthanum. The binary metal halide functional electrolyte may result in a solid solution plated material of $Zr_xLa_y$, where the ratios of x to y are in a zirconium-lean solid solution with lanthanum. A zirconium-lean solid solution with lanthanum, means a non-stoichiometric ratio of zirconium and lanthanum, with less zirconium than lanthanum. In some embodiments, a $Zr_xLa_y$ composition is plated where x to y ratios are in a stoichiometric alloyed ratio of zirconium with lanthanum. In some embodiments, a $Zr_xLa_y$ composition is plated where x to y ratios are in a zirconium-rich solid solution with lanthanum. A zirconium-rich solid solution with lanthanum, means a non-stoichiometric ratio of zirconium and lanthanum, with more zirconium than lanthanum. In some embodiments, the solid-solution ratios are y=4, and x is in a range from about 0.5 to about 2.

The salt melt is formed in an apparatus under conditions to form a molten salt plating bath. The counter electrode of the electrode assembly is selected to be the same material as the metal coating or metal alloy coating that is being plated. The counter electrode forms part of the plating circuit along with the working electrode (e.g., the cathode), the molten salt plating bath (e.g., salt melt under electroplating conditions), and the power source (e.g., potentiostat). For example, for titanium plating, the counter electrode may be a titanium wire or a titanium plate or an alloy of titanium. For zirconium plating, the counter electrode may be a zirconium wire or a zirconium plate or an alloy of zirconium. For titanium-zirconium alloy plating, the counter electrode may be a titanium-zirconium wire, a titanium wire and a zirconium wire, or a titanium-zirconium plate. For titanium-lanthanum alloy plating, the counter electrode may be a titanium-lanthanum wire, a titanium wire and a lanthanum wire, or a titanium-lanthanum plate. The counter electrode may serve as a source of metal ions to replenish in the salt melt during plating. For example, the counter electrode may be incrementally immersed in the salt melt with a feed of functional electrolyte metal(s) precursor, to replace an approximate amount of metal that has been plated onto the cathode. Consequently, the material of the counter electrode is consonant with the material of functional electrolyte, to continue to keep functional electrolyte concentrations from about 60 wt. % to about 81.5 wt. %.

An optional reference electrode of the electrode assembly may be a glassy carbon rod. However, other suitable reference electrodes may be used. Examples of suitable reference electrodes include but are not limited to: nickel/nickel oxide, silver/silver bromide, silver/silver chloride and/or a noble metal (platinum, iridium, ruthenium) wire. In some embodiments, the process may be conducted without a reference electrode. For example, the plating process may be conducted with a direct current source connected to the anode (counter electrode) and cathode (working electrode). The anode may be a bussed anode. Such an arrangement may be used for plating multiple parts attached to multiple working electrodes simultaneously in a shared molten salt plating bath. Such a setup may opt to forgo the reference electrode and just utilize the potentials across the individual working electrodes to the bussed counter electrode in order to control the plating operation.

The molten salt plating bath may be established to maintain the salt melt at a temperature of from about 350° C. to about 450° C. when used to plate the metal onto the thermally conductive substrate. Alternately, higher temperatures may be used, for example, up to about 900° C. However, the use of lower temperatures may be advantageous. For example, keeping the molten salt plating bath at a lower temperature may utilize less energy. Also, a wider variety of substrate materials may be compatible with lower temperatures. For plating, the current density may be between about 150 Amp/ft$^2$ and about 300 Amp/ft$^2$. The current density may be between about 200 Amp/ft$^2$ and about 300 Amp/ft$^2$. The current density may also be adjusted based upon the ratio of functional electrolyte to auxiliary electrolyte present in the salt melt. The current density may also be adjusted based upon the molten salt plating bath temperature and composition. Higher amounts of functional electrolyte may support higher current densities.

The counter electrode and working electrode may be configured in a fixed relationship during the plating process. In other examples, one or both of the counter electrode and working electrode may be moved during plating so as to agitate the molten salt plating bath. For example, the working electrode may be oscillated back and forth in the molten salt plating bath in order to increase agitation of the molten salt plating bath and reduce any boundary layer effects. The degree of agitation may be a function of the size of the workpiece attached to the working electrode. For example, if the workpiece has a width of about 3 cm, then the motion of the agitation may be a function of the width, e.g., about 3 cm. Agitation may be in the direction of a width of the workpiece. Alternately, agitation may be perpendicular to the width of the workpiece. Determining the optimal agitation may depend, in part, on the composition and viscosity of the molten salt plating bath. In some embodiments, agitation may be done by external processes such as by inductive stirring.

The molten salt plating bath disclosed above may be used, for example, to coat components of a PNG. One component of a PNG which may electroplated according to embodiments of the disclosure is the metal hydride target. The metal hydride target includes a substrate and a metal coating. The metal coating may be the electroplated metal formed as previously described. The metal coating is configured to store hydrogen, such as deuterium and/or tritium, in the metal hydride target. The metal coating functions as a source for the deuterium and/or tritium for use by the PNG. The substrate to be plated may be oxygen free high conductivity copper (OFHC).

The metal hydride target includes a conductive metal substrate that is plated with the metal coating. The metal hydride target of the PNG may be configured as a disk. The metal hydride target may be flat or convex. The metal hydride target may be substantially symmetrical. The PNG also includes a reservoir among its components. The reservoir may be similarly electroplated according to embodiments of the disclosure with a metal coating. The reservoir may have a complex shape. A portion of the metal hydride target or the reservoir may be masked to control the location of the plating. For example, the back side of the metal hydride target may be masked to avoid depositing metal on the back side of the metal hydride target.

The substrate, such as the target or reservoir of the PNG, is subjected to cleaning prior to plating. In an example, the substrate may be sandblasted and then cleaned with acetone using ultrasonic agitation. The substrate may then be baked in an oven overnight. The substrate is attached to the working electrode, which may function as the cathode during plating. Alternatively, the substrate may be subjected to electrolytic cleaning prior to plating. For example, the substrate may be etched prior to plating. In another example, the substrate may be subjected to pulsed plating, which includes plating the substrate for a period of time, etching the substrate for a period of time, and then repeatedly plating and etching the part. The etching time may be between about 1 minute and about 10 minutes. For example, the etching time may be about 5 minutes. The initial plating period prior to etching may be from about 1 minute to about 10 minutes. In an example, the initial plating period may be about 5 minutes.

The substrate is plated for about 30 minutes to about 120 minutes. Longer or shorter times may be used depending on the desired thickness of the plated material. The substrate is attached to the cathode while plating. Metal ions from the salt melt combine with electrons at the cathode and have their charge neutralized, causing the metal to deposit on the surface of the substrate.

After formation of the plated metal coating, the metallic plated article is removed from the molten salt plating bath and the metallic plated article is allowed to cool in a non-oxidizing (e.g., non-oxygen) atmosphere. For example, the metallic plated article may be cooled in an argon glove box. The use of a non-oxidizing atmosphere may reduce the tendency of the coating to oxidize while cooling. For example, titanium may react with oxygen to form a surface oxide, e.g., $TiO_2$, if an oxidizing atmosphere is used.

The metallic plated article may be then subjected to a cleaning process to remove any salt from the surface. For example, the metallic plated article may be placed in a water bath to remove (e.g., dissolve off) the salt. In other examples, the metallic plated article is heated in an inert atmosphere to remove the salt.

Once the salt has been removed, the metallic plated article may be annealed, e.g., to bond the plated metal coating to the thermally conductive substrate. The annealing is performed in an inert atmosphere (e.g., argon, helium). The annealing may be conducted for from about 8 hours to about 16 hours at 500° C. to 600° C. The annealing may serve to close any irregularities such as an overall porosity that may be manifest as dislocations or pinholes in the plated metal coating.

The deuterium or tritium may then be incorporated into the plated metal coating of the metallic plated article. For example, the metallic plated article (e.g., the target or reservoir) may be heated to an elevated temperature (e.g., about 500° C.). The deuterium or tritium is then released in the oven and absorbed into the coating, which acts as a getter. The incorporation of the deuterium or tritium into the plated coating of the metallic plated article may be performed with the annealing operation described above. For example, the plated metal coating may be formed as part of the annealing operation. However, the loading of the plated metal coating of the metallic plated article with deuterium or tritium may also be a separate operation from the annealing operation. Incorporating the deuterium or tritium into the plated metal coating forms a metal hydride coating on the plated metal coating of the metallic plated article.

Referring to FIG. 1, a system 150 for coating or plating conductive components (e.g., conductive substrates) with metal is shown in accordance with one or more embodiments of the present disclosure. The system 150 includes a furnace well 152 which, in some embodiments, may be formed of a stainless steel material. A secondary crucible 154 may be disposed within the furnace well. In some embodiments, the secondary crucible may also be formed of a stainless steel material. One or more support members 156 may be disposed within the secondary crucible 154 to support a primary crucible 158. The support member 156 may be formed, for example, of a material such as alumina-silica. The support member 156 may provide electrical insulation of the primary crucible 158 from the secondary crucible 154 and the furnace well 152. In some embodiments, the primary crucible 158 may be formed of an alumina material. In another embodiment, the primary crucible may be formed of a nickel material.

The secondary crucible 154, support member 156 and primary crucible 158 may be positioned within a lower portion 160 of the furnace well 152 with a heat baffle 162 separating such components from an upper portion 164 of the furnace well 152. A heater may be used to heat various components. In one example, resistance heating elements 166 may be positioned adjacent to a portion of the secondary crucible 154 and/or a portion of the furnace well 152 in order to provide sufficient heat to the primary crucible 158 during operation of the system. A variety of different types of heaters or heating systems may be used in conjunction with the present disclosure.

A second heat baffle 170 may be positioned between the upper portion of the furnace well 152 and a glove box or other chamber 172. In some embodiments, the chamber may be formed of a material such as stainless steel and be filled with argon or some other inert gas to provide a controlled atmosphere. In various embodiments, heat shields 174, such as copper heat shields, may be associated with the heat baffles 162 and 170. A coolant system may include, for example, coolant lines 176 positioned against a portion of the furnace well (e.g., adjacent a portion of the upper portion 164 between the first set of heat baffles 162 and the second set of heat baffles 170) to insulate the glove box 172 and other components from the heat associated with the electrodeposition process that takes place in the lower portion 160 of the furnace well 152.

An electrode assembly 180 of the system 150 may include a working electrode 182, a reference electrode 184 and a counter electrode 186. The working electrode 182 comprises, or is otherwise coupled with, a workpiece 188 (e.g., the substrate to be coated). While the workpiece 188 is shown generally as a plate, it may include a variety of other configurations including wires or structures having complex geometries. In some embodiments, the working electrode 182 may be formed of a material comprising oxygen free high conductivity copper, with the reference electrode 184 being formed of a glassy carbon rod, and the counter electrode 186 may be formed as a titanium wire (or other counter electrode depending on the material being plated). In some embodiments, the three electrodes 182, 184 and 186 may be held in position by a plug 190 (e.g., an aluminum plug) or other suitable structure such that the electrodes each extend down into a molten salt plating bath or salt melt 192 contained within the primary crucible 158. The salt melt 192 may include the auxiliary electrolyte and the functional electrolyte. The plug 190 may support other components as well, such as a temperature sensor and/or other data acquisition equipment. In some embodiments, the temperature sensor may include a thermocouple 194 extending into the bath or salt melt 192, the thermocouple 194 being coupled with an output device 196 to provide an instantaneous read-out or display of the temperature of the salt melt 192.

The electrodes 182, 184 and 186 may be coupled with a potentiostat 198 or other instrumentation, such as a DC power supply unit to control the operation of the electrodes, including controlling the voltage difference applied between the working electrode 182 and the reference electrode 184. A computer 200 or other controller (data acquisition system) may be associated with the potentiostat 198 for controlling the voltage and for obtaining data associated with the performance of the electrode assembly 180. In some configurations, the potentiostat 198 may be replaced with a direct current source.

The depicted system 150 may be used to produce the plated articles described above, including plated metal hydride targets or reservoirs for PNGs. The article to be plated is cleaned and placed on the working electrode 182. Power is applied between the working electrode 182 (cathode) and the counter electrode 186 (anode). The article is plated with the metal of the functional electrolyte of the salt melt 192. In an example, the functional electrolyte is a titanium halide (e.g., $TiBr_4$) and the plated metal is titanium.

FIG. 2 depicts the schematic diagram of a portable neutron generator (PNG) 250 in accordance with one or more embodiments of the present disclosure. The PNG includes a positive ion source 210, such as a Penning ion source. The PNG includes a direct current (DC) ion accelerator. The PNG includes a neutron-producing, metal hydride target 212 containing deuterium ($^2H$), tritium ($^3H$), or both. The metal hydride target of the PNG may be the coated article or coated substrate described above. The PNG also includes a gas-control reservoir, which may also be made of a metal hydride material. The metal hydride of the target and/or of the reservoir may be formed according to embodiments of the disclosure. The PNG may also include a shroud 214 near the target.

FIG. 3 depicts a coated article 300 with a cross-section elevation of a substrate 388 and a metallic coating 389. The coated article 300 includes the substrate 388, such as the workpiece 188 illustrated in FIG. 1, an external coating 389B, and a metal interface coating 389A that is a transition region between the substrate 388 and the external coating 389B. The substrate 388 may, for example, be an OFHC copper substrate 388. The coated article 300 may be employed where the external coating 389B is a PNG target face 389B. In some embodiments, the metal interface coating 389A is a transition region between the material (e.g., chemical composition) of the substrate 388, and the external coating 389B, where a single phase of metal or metal alloy has been plated onto the substrate 388, according to any of the disclosed embodiments. In some embodiments, the metal interface coating 389A is an interface between the external coating 389B and the substrate where the metal interface coating 389A has a first metal grain morphology transition, and the external coating 389B has a second grain morphology.

FIG. 4 depicts a coated article 400 with a cross-section elevation of a substrate 488 and a metallic coating 489. The coated article 400 includes a substrate 488, such as the workpiece 188 illustrated in FIG. 1. The substrate 488 may, for example, be an OFHC copper substrate 488. The coated article 400 includes a metal interface coating 489A between the substrate 488, and an external coating 489B. In some embodiments, the metal interface coating 489A is a first-plated, first-annealed material that is thereafter returned to the molten salt plating bath before plating the external coating 489B onto the metal interface coating 489A. After plating the external coating 489B, the coated article 400 is rinsed and annealed similar to techniques described herein. The annealing method may alter the grain morphology and also may reduce porosity of the first-annealed material. In some embodiments, the metallic coating 489 includes the metal interface coating 489A, which provides a grain morphology that is useful as a deposition substrate for the plating the external coating 489B. The metal interface coating 489A may have a first metal grain morphology and the external coating 489B may have a second grain morphology. The metal interface coating 489A and the external coating 489B may have the same grain morphology.

Referring to FIG. 3, in some embodiments, the coated articles are prepared by a reduction mechanism of oxides on the external coating, e.g., the metallic coating 389. The coated articles are prepared by cleaning and then applying (e.g., by vapor deposition) a layer of metal oxide onto the substrate. The metal oxide is then reduced to the corresponding metal to achieve a coated article such as the coated article 300. For example, the metal oxide may be formed in a reducing oven including hydrogen gas. The hydrogen gas reacts with the metal oxide to disrupt the metal oxide. The metal oxide may then be placed in a salt bath attached to the cathode. Current is applied to reduce the metal oxide on the substrate attached to the cathode. The substrate may be attached to the cathode for several hours, e.g., from about six hours to about sixteen hours. The salt bath may be substantially free of functional electrolyte. For example, the salt bath may be a calcium chloride ($CaCl_2$)) bath. In some instances, the salt bath is maintained at a higher temperature than the plating baths described above, e.g., from about 700° C. to about 900° C. A reducing potential is applied on the working electrode of between about 2.5 volts cathodic and about 3.1 volts cathodic compared with the counter electrode.

Once the metal oxide has been reduced to a metal, the metal is present as a porous metal coating on the substrate. The substrate may be subjected to an annealing step. The substrate may be annealed for several hours such as from four (4) hours to 24 hours, at a temperature of between about 500° C. and about 600° C. The anneal method may serve to close any pinholes in the metal coating. The anneal method may also improve adhesion of the metal coating to the substrate. The anneal method may be conducted with some time overlap between annealing and introducing at least one of deuterium and tritium into the metal coating of the substrate. The annealing method may also precede introducing at least one of deuterium and tritium into the metal coating of the substrate. The annealing method may also be conducted to resolve residual stresses in the grain structure of the deposited metal onto the substrate. In deposited binary metal embodiments, the annealing method may be conducted to resolve residual stresses in the grain structure of the deposited alloy. The annealing method may also be conducted to resolve residual stresses between the workpiece 188 of FIG. 1 and the metal or metal alloy, as well as in the grain structure of the deposited metal onto the substrate.

At the end of the annealing method, including before allowing the annealed article to cool to room temperature, deuterium gas and/or tritium gas may be introduced into the oven, with the metallic coating on the substrate functioning as a getter to absorb the deuterium and/or tritium. Alternately, the two processes may be conducted as separate processes, first the annealing method in a first containment structure, and then incorporating the deuterium and/or tritium gas into the metal coating as a separate process in a subsequent containment structure.

The plating processes according to embodiments of the disclosure may be used to form coated articles for a variety of devices beyond portable neutron generators. Titanium and its alloys are widely used in many sectors (aerospace, automotive, space, chemical, biomedical etc.). The coated articles used in these sectors may use some kind of surface treatment methods to enhance their usability/service life, such as by forming the metal coating described above on titanium or titanium alloy substrates. The metal coating process described in this disclosure may also be extended to the following applications:

Seawater environment in resisting corrosion: Surface-coated titanium upon exposure to marine environments will quickly form a surface oxide ($TiO_2$) which may limit corrosion. Coating substrates with titanium by use of any example method set forth herein, may serve to reduce corrosion in seawater.

Titanium-coated components may be anodized by making the Ti-coated component an anode (e.g., in the presence of phosphate ions), after the coating is performed. Such a process may be designed to electrochemically grow surface oxide layers (of varying thicknesses). These anodized products have a wide market in medical implants and aerospace industries. The anodized components exhibit little-to-no dimensional changes (as the anodization may be performed at room temperature), which is the primary benefit. Other properties include enhanced friction performance, anti-galling and increased wear-resistance. Anodized titanium is also widely used in the metal finishing industry to impart permanent coloration to the finished products by way of controlling the thicknesses of the surface oxide layers. Such a treatment delivers twin properties: hardening and coloring without changing the mechanical properties of titanium. The colors may easily identify the different components in a complex structure (such as in an airplane). The additive-free finish of the colored components and parts help retain their resistance to both high heat and corrosion.

The coated articles may be used as a cathode to dope it with copper. Copper-doped $TiO_2$ has been proposed for osseointegration of implants (biomedical application).

$TiO_2$ coatings have physical properties as follows: high surface hardness, good wear resistance, low friction coefficient, and excellent corrosion resistance. Some elements (boron, silver, calcium and strontium) may be doped onto $TiO_2$ to enhance its bioactivity/biological properties. Titanium oxide coatings may be formed by anodizing titanium metal coatings. In an example, the titanium coated part is attached to an anode in a salt water bath at room temperature, the salt water bath may contain trisodium phosphate (TSP). The applied voltage is used to control the oxide thickness and resulting color of the anodized part. The process is self-limiting as the titanium oxide forms, the oxide serves as an insulator to limit additional oxide formation. This allows formation of uniform oxide coatings of a controlled thickness on titanium parts or titanium coatings.

Electroplated titanium may be used as the starting material to form a series of intermetallic aluminides on its surface. Onto the Ti-coated substrates, first platinum (e.g., about 5 μm thick) and then aluminum may be plated. The coated substrate may be subsequently annealed in an inert atmosphere, e.g., argon at about 700° C., to enhance the formation of a platinum aluminide intermetallic compound on the surface. Such a component has shown promise for application in the compressor section of the modern gas turbines. Accordingly, electroplated titanium on metallic substrates may be used in a wide variety of applications.

The following examples serve to further illustrate embodiments of the disclosure in more detail. These examples are not to be construed as being exhaustive or exclusive as to the scope of this disclosure.

EXAMPLES

Example 1

The substrate of the PNG target or reservoir to be plated is prepared by a sandblasting roughening treatment. This roughening treatment is followed by an acetone soak of the substrate in ultrasonic agitation. The cleaned substrate of the target or reservoir is then placed into a furnace for about 8 to about 12 hours under reducing conditions. The substrate of the target or reservoir is then connected to a cathode in a plating cell in an inert atmosphere, e.g., argon in a glove box.

The plating cell includes a salt melt which contains the metal to be plated onto the substrate. The salt melt includes the auxiliary electrolyte and the functional electrolyte. The auxiliary electrolyte includes an alkali metal salt or an alkali earth metal salt, such as potassium bromide, lithium bromide, or cesium bromide. The auxiliary electrolyte salts are present as a eutectic mixture.

The functional electrolyte is the source of the metal being plated onto the substrate from the salt melt. The functional electrolyte is a bromide, iodide, and/or fluoride of the metal to be plated, such as titanium bromide, titanium iodide, titanium fluoride, or a combination of these materials if the metal to be plated is titanium. The functional electrolyte accounts for at least about 60 wt. % of the salt melt, with the remainder of the salt melt may be the auxiliary electrolyte. In some embodiments of this example, the functional electrolyte accounts for about 80 wt. % of the salt melt, and the auxiliary electrolyte accounts for about 20 wt. % of the salt melt.

Upon immersion in the salt melt, the target or reservoir is etched as the anode for 15-20 minutes and/or subject to pulse plating prior to plating as the cathode. The pulse plating is conducted with a current density of about 150 Amp/ft$^2$ with alternating polarization to produce deposition, stripping, and redeposition of the plated species.

The counter electrode (anode) is a wire or a plate or a rod of the material being plated. For example, during titanium plating the anode is titanium wire. The anode dissolves into the salt melt during plating, as material from the anode is incrementally added to the molten salt plating bath to replace material plated at the cathode.

In this example, the reference electrode is a glassy carbon rod. The use of a reference electrode is optional. It may be useful to include a reference electrode if controlling the operation with a potentiostat/galvanostat. However, for a multichannel plating setup, the use of a reference electrode may be eliminated to reduce the number of electrodes in the bath.

Plating is conducted for from about 30 min to about 120 min with a current density of about 150 Amp/ft$^2$ to about 300 Amp/ft$^2$. The molten salt plating bath temperature is maintained at about 350° C. to about 450° C.

After cooling, the plated component (e.g., target or reservoir) is cleaned such as it is rinsed with water to remove the salt from the plating process. This rinse is conducted at room temperature. Alternately, for example, for a rare earth element plating, heating the plated articles from about 200° C. to about 300° C. under a dynamic vacuum is used to remove the salt from the plated surface.

The cleaned target or reservoir is heat treated at from about 500° C. to about 1000° C. for about 12 hours to promote diffusion. The article may be treated at from about 500° C. to about 600° C. The heat treatment is in an inert gas environment, e.g., helium, argon. Limiting oxygen in the heat treatment environment reduces or prevents oxidation of the coating.

To incorporate deuterium and/or tritium into the titanium plated target or reservoir, a deuterium or tritium source is introduced into an oven with the titanium plated target maintained at a temperature of from about 400° C. to about 600° C. The plated metal (e.g., titanium) acts as a getter to absorb the deuterium and/or tritium. The deuterium or tritium account for a portion of the atmosphere in the oven. For example, the deuterium or tritium account for about 2% of the atmosphere with the remainder provided by inert gases, e.g., argon.

Example 2

The substrate of the target or reservoir is prepared by sandblasting roughening treatment. This roughening treatment may be followed by an acetone soak of the substrate in ultrasonic agitation. The cleaned substrate of the target or reservoir may then be placed into a furnace for from about 8 to about 12 hours.

The target or reservoir is then coated with a metal oxide, e.g., titanium dioxide. The metal oxide is then subjected to a hydrogen atmosphere bake at about 900° C. for about 60 minutes. Hydrogen makes up about 2.75% of the atmosphere with the rest being inert gases, e.g., argon. Once baked, the metal oxide is subject to reduction in a salt bath, e.g., a calcium chloride ($CaCl_2$)) bath, at about 2.5 volts to about 3.1 volts for about 10 hours. The salt bath is maintained at a higher temperature, for example, from about 700° C. to about 900° C. The result is a porous metal film on the substrate.

The metalized target or reservoir may be cleaned such as it is rinsed with water to remove the salt from the reduction process. Alternately, for rare earth element coatings, heating from about 200° C. to about 300° C. under dynamic vacuum may be used to remove the salt.

The cleaned target or reservoir is heat treated at from about 500° C. to about 1000° C. for about 12 hours to promote diffusion. The heat treatment is in an inert gas environment, e.g., helium, argon. Limiting oxygen in the heat treatment environment reduces or prevents oxidation of the coating. It may be desirable to limit the amount of oxide that accumulates on the coating. However, the described materials readily combine with oxygen when heated. Accordingly, it may be useful to limit the availability of oxygen when conducting processes at elevated temperatures. One approach to limiting oxygen is to conduct reducing and/or annealing operations in an inert, non-oxidizing atmosphere.

The target or reservoir is then ready to be loaded with deuterium and/or tritium. This is accomplished by introducing a deuterium or tritium source into an oven with the article maintained at a temperature of from about 400° C. to about 600° C. The reduced metal (e.g., titanium) acts as a getter to absorb the deuterium and/or tritium. The deuterium or tritium may make up a portion of the atmosphere in the oven. For example, the deuterium or tritium make up about 2% of the atmosphere with the remainder provided by inert gases, e.g., argon.

Example 3

The substrate of the PNG target or reservoir to be plated is prepared by creating a roughening of the surfaces of an oxygen free high conductivity copper (OFHC) substrate. This roughening of the surfaces is followed by an acetone soak of the OFHC substrate in ultrasonic agitation. The cleaned OFHC substrate of the PNG target or reservoir is then placed into a furnace for about 8 to about 12 hours, under conditions to drive impurities from the OFHC substrate of the PNG target or reservoir, such as a temperature range from about 400° C. to about 600° C., and 100 percent inert gas atmosphere of helium or argon. The OFHC substrate of the PNG target or reservoir is then connected to a cathode in a plating cell in an inert atmosphere, e.g., argon in a glove box. The plating cell includes a molten salt plating bath that contains a titanium halide functional electrolyte, from which titanium metal is to be plated onto the substrate. The molten salt plating bath includes the auxiliary electrolyte such as a ternary lithium-potassium-cesium halide mixture in ratios that form an eutectic melt, such that the auxiliary electrolyte as both a ternary and an eutectic combination of lithium, potassium and cesium, dissolves the titanium metal at the counter electrode (e.g., the counter electrode 186 depicted in FIG. 1). The dissolved titanium metal in the molten salt plating bath is then transported through the electrolytes under an electrical potential and current and reduced onto the working electrode (e.g., the working electrode 182 depicted in FIG. 1) under conditions to form a titanium coating onto the OFHC substrate of the PNG target or reservoir. Cleaning and annealing the coating on the coated article is then carried out. In this example, potassium bromide, lithium bromide, and cesium bromide are introduced to the primary crucible 158 (e.g., the primary crucible 158 depicted in FIG. 1) in ratios to achieve a ternary eutectic mixture of auxiliary halide electrolyte from eutectic-precursor amounts, by achieving the eutectic state at a temperature range from about 310° C. to about 325° C. Thereafter, the salt melt 192 is raised in temperature to about 350° C., and the working electrode 182 is introduced into the salt melt 192.

The functional electrolyte is the source of the metal being plated onto the substrate from the salt melt. The functional electrolyte is a bromide, iodide, and/or fluoride of the metal to be plated, such as titanium bromide, titanium iodide, titanium fluoride, or a combination of these materials. The functional electrolyte accounts for at least about 60 wt. % of the salt melt, and the remainder of the salt melt may be the auxiliary electrolyte. In some embodiments of this example, the functional electrolyte accounts for about 80 wt. % of the salt melt, and the remainder of the salt melt accounts for about 20 wt. % of the salt melt.

Upon immersion in the salt melt, the OFHC substrate of the PNG target or reservoir is etched as the anode for 15-20 minutes and/or subject to pulse plating prior to plating as the cathode. The pulse plating is conducted with a current density of about 150 Amp/$ft^2$ with alternating polarization to produce deposition, stripping, and redeposition of the plated titanium pieces.

The counter electrode (anode) is a wire or plate or a rod of titanium. For example, during titanium plating the anode is titanium wire. The titanium anode dissolves into the salt melt during plating as material from the anode is added to the salt bath to replace material plated at the cathode.

In this example, the reference electrode is a glassy carbon rod. The use of a reference electrode is optional. The reference electrode is used for controlling the operation with a potentiostat/galvanostat. However, for a multichannel plating setup, the use of a reference electrode may be eliminated to reduce the number of electrodes in the bath.

Plating is conducted for from about 30 min to about 120 min with a current density of about 150 Amp/$ft^2$ to about 300 Amp/$ft^2$. The salt melt temperature is maintained at about 350° C. to about 450° C.

After cooling, the plated titanium on the OFHC substrate is cleaned such as it is rinsed with water to remove the salt from the plating process. This rinse is conducted at room temperature. Alternately, for example, heating the titanium plated OFHC substrate is done from about 200° C. to about 300° C. in an inert atmosphere to remove the salt from the plated surface.

The cleaned titanium-plated OFHC substrate is heat treated at from about 500° C. to about 1000° C. for about 12 hours under anneal conditions to close imperfections in the titanium coating such as pinholes, to reduce porosity, and to promote diffusion across the OFHC substrate. The titanium coated, OFHC article may be treated at from about 500° C. to about 600° C. The heat treatment is in an inert gas environment, e.g., helium, argon. Limiting oxygen in the heat treatment environment reduces or prevents oxidation of the coating.

After heat treating, the titanium coated, OFHC article is exposed to either deuterium or tritium, or a combination thereof, such that a deuterium or tritium source is introduced into an oven with the titanium coated, OFHC article, at a temperature of from about 400° C. to about 600° C. The plated titanium acts as a getter to absorb the deuterium and/or tritium. The deuterium or tritium account for a portion of the atmosphere in the oven. For example, the deuterium or tritium account for about 2% of the atmosphere with the remainder provided by inert gases, e.g., argon.

Example 4

The conditions of Example 3 are carried out to obtain a first coating of titanium, and after cleaning and the annealing process, the OFHC substrate with the first titanium coating, is re-introduced to the salt melt to apply a second coating. In the second coating technique, a higher current density is used where plating onto the first coating may be more uniform where deposition matches the metal lattice of the annealed first coating. Rinsing and other cleaning is also repeated to remove salts. Anneal conditions are repeated, although they may be for shorter duration. Thereafter, hydrides are formed onto the coating by exposure of the titanium-coated, OFHC article to either deuterium or tritium treatment.

Example 4A

The conditions similar to those of Example 4 are carried out, and the metals to be plated are combined from a titanium halide and lanthanum halide functional electrolyte mixture during deposition to form a titanium lanthanum solid solution on a thermally conductive substrate such as an OFHC substrate. Thereby, a metal interface material (e.g., the metal interface coating 489A depicted in FIG. 4) is formed upon the substrate. After cleaning and annealing, a titanium halide and lanthanum halide functional electrolyte mixture is subsequently used to form a titanium lanthanum solid solution external coating (e.g., the external coating 489B depicted in FIG. 4) above the substrate.

Example 4B

The conditions similar to those of Example 4 are carried out, and the metals to be plated are combined from a titanium halide and zirconium halide functional electrolyte mixture during deposition to form a titanium zirconium solid solution upon a thermally conductive substrate such as an OFHC substrate. Thereby, a metal interface material (e.g., the metal interface coating 489A depicted in FIG. 4) is formed upon the substrate. After cleaning and annealing, a titanium halide and zirconium halide functional electrolyte mixture is subsequently used to form a titanium zirconium solid solution external coating (e.g., the external coating 489B depicted in FIG. 4) above the substrate.

Example 4C

The conditions similar to those of Example 4 are carried out, and the metals to be plated are combined during deposition from a titanium halide and palladium halide functional electrolyte mixture during deposition to form a titanium palladium solid solution upon a substrate such as an OFHC substrate. Thereby, a metal interface (e.g., the metal interface coating 489A depicted in FIG. 4) is formed upon the substrate. After cleansing and annealing, a titanium halide and palladium halide functional electrolyte mixture is subsequently used to form a titanium palladium solid solution external coating (e.g., the external coating 489B depicted in FIG. 4) above the substrate.

Example 5

The conditions of Example 3 are carried out, and the metal to be plated is formed from titanium halide and lanthanum halide functional electrolyte mixture to form a titanium lanthanum solid solution upon the OFHC substrate.

Example 6

The conditions of Example 3 are carried out, and the metal to be plated is formed from a titanium halide and zirconium halide functional electrolyte mixture to form a titanium zirconium solid solution upon the OFHC substrate.

Example 7

The conditions of Example 3 are carried out, and the metal to be plated is a titanium halide and palladium halide functional electrolyte mixture to form a titanium palladium solid solution upon the OFHC substrate.

Example 8

The conditions of any of Examples 3, 4, 5, 6, 7, or 8 is carried out. The metal(s) that is plated from a functional electrolyte metal halide is incrementally added to replace the functional electrolyte(s) during the plating process to replace an approximate amount of metal(s) that is leaving the plating solution and depositing upon the cathode.

Although the foregoing descriptions contain many specifics, these are not to be construed as limiting the scope of the disclosure, but merely as providing certain exemplary embodiments. Similarly, other embodiments of the disclosure may be devised that do not depart from the scope of the disclosure. For example, features described herein with reference to one embodiment may also be provided in others of the embodiments described herein. The scope of the embodiments of the disclosure is, therefore, indicated and limited only by the appended claims and their legal equivalents, rather than by the foregoing description. All additions, deletions, and modifications to the disclosure, as disclosed herein, which fall within the meaning and scope of the claims, are encompassed by the disclosure.

What is claimed is:

1. A method of forming a metal coated article, comprising:
    forming a metal halide in a molten salt plating bath at a first temperature, wherein forming the metal halide in the molten salt plating bath further comprises:
        forming at least one functional metal halide electrolyte; and
        forming at least two auxiliary metal halide electrolytes at eutectic conditions;
    increasing the first temperature to a second temperature;
    forming a plated metal coating from the at least one functional metal halide electrolyte onto a thermally conductive substrate; and
    introducing at least one of deuterium and tritium into the plated metal coating.

2. The method of claim 1, wherein forming at least two auxiliary metal halide electrolytes at eutectic conditions comprises forming the at least two auxiliary metal halide electrolytes comprising a eutectic composition including metal halides, metals of the metal halide including lithium, potassium and cesium, and the halides comprising:
    fluorine, chlorine, bromine and iodine; and
    at least two of fluorine, iodine and bromine.

3. The method of claim 2, wherein the at least one functional metal halide electrolyte comprises a metal halide selected from the group consisting of $TiBr_4$, $TiI_4$, $TiF_4$, $ZrBr_4$, $ZrI_4$, $ZrF_4$, $HfBr_4$, $HfI_4$, $HfF_4$, $VBr_3$, $VI_3$, $VF_3$, NbBr$_5$, NbI$_5$, NbF$_5$, LaBr$_3$, LaI$_3$, LaF$_3$, YBr$_3$, YI$_3$, YF$_3$, NdBr$_3$, NdI$_3$, NdF$_3$, ThBr$_4$, ThI$_4$, ThF$_4$, PdBr$_2$, PdF$_2$, and PdI$_2$; and wherein forming a metal halide in a molten salt plating bath comprises:

forming a binary metal halide auxiliary electrolyte composition at the first temperature;

adding a metal halide auxiliary electrolyte to form a ternary metal halide auxiliary electrolyte composition; and increasing the first temperature to the second temperature.

4. The method of claim 2, wherein the at least one functional metal halide electrolyte comprises a metal halide, the metal halide selected from the group consisting of TiBr$_4$, TiI$_4$, TiF$_4$, ZrBr$_4$, ZrI$_4$, ZrF$_4$, HfBr$_4$, HfI$_4$, HfF$_4$, VBr$_3$, VI$_3$, VF$_3$, NbBr$_5$, NbI$_5$, NbF$_5$, LaBr$_3$, LaI$_3$, LaF$_3$, YBr$_3$, YI$_3$, YF$_3$, NdBr$_3$, NdI$_3$, NdF$_3$, ThBr$_4$, ThI$_4$, ThF$_4$, PdBr$_2$, PdF$_2$, and PdI$_2$; and wherein forming a metal halide in a molten salt plating bath comprises:

forming a binary metal halide auxiliary electrolyte composition at the first temperature;

adding a metal halide auxiliary electrolyte to form a ternary metal halide auxiliary electrolyte composition; and incrementally replacing the at least one functional metal halide electrolyte during forming the plated metal coating from the at least one functional metal halide electrolyte.

5. The method of claim 1, wherein:

forming a plated metal coating onto a thermally conductive substrate comprises:

plating titanium onto the thermally conductive substrate; and further comprising annealing the titanium under conditions to achieve a titanium plated metal coating on the thermally conductive substrate.

6. The method of claim 1, wherein:

forming a plated metal coating; onto a thermally conductive substrate comprises:

plating a metal alloy coating selected from the group consisting of:

titanium-lean solid-solution titanium-zirconium, stoichiometric titanium-zirconium, and titanium-rich solid-solution rich titanium-zirconium onto the thermally conductive substrate; and titanium-lean solid solution titanium-lanthanum, stoichiometric titanium-lanthanum, and titanium-rich solid-solution titanium-lanthanum onto the thermally conductive substrate.

7. The method of claim 1, wherein introducing at least one of deuterium and tritium into the plated metal coating comprises introducing at least one of the deuterium and the tritium at a temperature of from about 400° C. to about 600° C.

8. The method of claim 1, wherein forming the plated metal coating comprises one of:

forming the plated metal coating selected from the group consisting of Ti, Zr, Hf, La, V, Hf, Nb$_5$, Y, Nd, Th, and Pd; or forming a metal alloy plated coating selected from the group consisting of a plated material of Ti$_x$Zr$_y$, a plated material of Ti$_x$La$_y$, and plated material of Zr$_x$La$_y$, wherein y=4, and x is in a range from 0.5 to 2.

9. The method of claim 1:

wherein forming at least one functional metal halide electrolyte comprises forming the at least one functional metal halide electrolyte comprising from about 60 wt. % to about 80 wt. % of the molten salt plating bath, and wherein forming at least two auxiliary metal halide electrolytes comprises forming an auxiliary electrolyte comprising a ternary metal halide auxiliary electrolyte eutectic composition comprising from about 20 wt. % to about 40 wt. % of the molten salt plating bath, the method further comprising:

forming a metal alloy plated coating selected from the group consisting of a titanium-lean solid solution plated material of Ti$_x$Zr$_y$, a titanium-rich solid solution plated material of Ti$_x$Zr$_y$, a titanium-lean solid solution plated material of Ti$_x$La$_y$, a titanium-rich solid solution plated material of Ti$_x$La$_y$, a zirconium-lean solid solution plated material of Zr$_x$La$_y$, and zirconium-rich solid solution plated material of Zr$_x$La$_y$, wherein y=4, and wherein x is in a range from 0.5 to 2.

10. The method of claim 1, wherein forming the plated metal coating further comprises:

forming a metallic interface coating on the thermally conductive substrate;

annealing the metallic interface coating;

forming an external coating on the metallic interface coating;

annealing the external coating; and introducing the at least one of deuterium and tritium into the plated metal coating at the external coating.

11. The method of claim 1, wherein the at least one functional metal halide electrolyte comprises from about 60 wt. % to about 80 wt. % of the molten salt plating bath, and wherein the at least two auxiliary metal halide electrolytes comprise a ternary metal halide auxiliary electrolyte eutectic composition comprising from about 20 wt. % to about 40 wt. % of the molten salt plating bath, the method further comprising:

incrementally immersing a counter electrode into the molten salt plating bath during forming the plated metal coating, wherein the counter electrode comprises a metallic material consonant with the at least one functional metal halide electrolyte.

12. A method of forming a metal coated article comprising:

plating a metal onto a thermally conductive substrate to form a plated metal coating on the thermally conductive substrate, the thermally conductive substrate selected from the group consisting of oxygen free high conductivity (OFHC) copper, copper, silver, aluminum, and nickel;

wherein plating the metal further comprises plating from a molten salt plating bath further comprising:

a ternary metal halide auxiliary electrolyte eutectic composition including lithium, potassium and cesium salts; and at least one metal halide functional electrolyte consisting of TiBr$_4$, TiI$_4$, TiF$_4$, ZrBr$_4$, ZrI$_4$, ZrF$_4$, HfBr$_4$, HfI$_4$, HfF$_4$, VBr$_3$, VI$_3$, VF$_3$, NbBr$_5$, NbI$_5$, NbF$_5$, LaBr$_3$, LaI$_3$, LaF$_3$, YBr$_3$, YI$_3$, YF$_3$, NdBr$_3$, NdI$_3$, NdF$_3$, ThBr$_4$, ThI$_4$, ThF$_4$, PdBr$_2$, PdF$_2$, and PdI$_2$;

cleaning the plated metal coating to remove at least some halides;
annealing the plated metal coating to achieve at least one of:
   altering grain morphology of the plated metal coating; and
   decreasing porosity of the plated metal coating; and
introducing at least one of deuterium and tritium into the plated metal coating.

13. The method of claim 12, wherein:
plating a metal onto a thermally conductive substrate comprises plating a titanium metal coating onto the thermally conductive substrate; and
annealing the titanium metal coating to produce a titanium coating on the thermally conductive substrate.

14. The method of claim 13, wherein plating the metal onto the thermally conductive substrate comprises plating two metals from the at least one metal halide functional electrolyte selected from the group consisting of titanium-zirconium, titanium-hafnium, titanium-lanthanum, titanium-palladium, zirconium-lanthanum, zirconium-hafnium, zirconium-palladium, hafnium-palladium, and palladium lanthanum.

15. The method of claim 14, wherein introducing at least one of deuterium and tritium into the plated metal coating comprises introducing the deuterium or the tritium at a temperature of from about 400° C. to about 600° C.

16. The method of claim 12, wherein the at least one metal halide functional electrolyte comprises from about 60 wt. % to about 80 wt. % of the molten salt plating bath, and wherein the ternary metal halide auxiliary electrolyte eutectic composition comprises from about 20 wt. % to about 40 wt. % of the molten salt plating bath.

17. The method of claim 15, wherein forming the plated metal coating further comprises:
forming a metallic interface coating on the thermally conductive substrate;
annealing the metallic interface coating;
forming an external coating on the metallic interface coating;
annealing the external coating; and
introducing the deuterium or the tritium into the external coating.

18. The method of claim 12, wherein the at least one metal halide functional electrolyte comprises from about 60 wt. % to about 80 wt. % of the molten salt plating bath, and wherein the ternary metal halide auxiliary electrolyte eutectic composition comprises from about 20 wt. bio to about 40 wt. % of the molten salt plating bath, the method further comprising:
incrementally immersing a counter electrode into the molten salt plating bath during forming the plated metal coating, wherein the counter electrode comprises a metallic material consonant with the at least one metal halide functional electrolyte.

19. A method of forming a metal coated article comprising:
forming a metal oxide on a thermally conductive substrate;
reducing the metal oxide to a metal coating under conditions comprising a temperature from about 700° C. to about 900° C. in the presence of hydrogen gas;
applying a reducing potential to the thermally conductive substrate within a calcium chloride salt bath in a range from about 2.5 volts cathodic and about 3.1 volts cathodic relative to a counter electrode;
annealing the metal coating in an inert atmosphere at a temperature of between about 500° C. and about 600° C.; and
introducing at least one of deuterium and tritium into the metal coating.

20. The method of claim 19, wherein reducing the metal oxide to a metal coating comprises reducing titanium dioxide to titanium.

* * * * *

UNITED STATES PATENT AND TRADEMARK OFFICE
CERTIFICATE OF CORRECTION

PATENT NO. : 11,746,434 B2
APPLICATION NO. : 17/813920
DATED : September 5, 2023
INVENTOR(S) : Prabhat K. Tripathy It is certified that error appears in the above-identified patent and that said Letters Patent is hereby corrected as shown below:

In the Specification

| | | |
|---|---|---|
| Column 6, | Line 61, | change "LiBr—KBr—CsBr" to --LiBr-KBr-CsBr-- |
| Column 6, | Line 63, | change "(LiI—KI—CsI)" to --(LiI-KI-CsI)-- |
| Column 7, | Lines 4-5, | change "LiBr—KI—CsBr, LiI—KI—CsBr, LiBr—KBr—KI," to --LiBr-KI-CsBr, LiI-KI-CsBr, LiBr-KBr-KI,-- |
| Column 7, | Line 49, | change "LiBr—KI—CsBr, LiI—KI—CsBr, LiBr-KBr—" to --LiBr-KI-CsBr, LiI-KI-CsBr, LiBr-KBr- -- |
| Column 7, | Lines 58-59, | change "LiBr—KF—CsBr, LiF—KF—CsBr, LiBr—KBr—KF," to --LiBr-KF-CsBr, LiF-KF-CsBr, LiBr-KBr-KF.-- |
| Column 7, | Lines 61-62, | change "LiF—KI—CsF, LiI—KI—CsF, LiF—KF—KI," to --LiF-KI-CsF, LiI-KI-CsF, LiF-KF-KI,-- |
| Column 17, | Line 65, | change "chloride ($CaCl_2$)) bath." to --chloride ($CaCl_2$) bath.-- |
| Column 21, | Line 1, | change "chloride ($CaCl_2$)) bath," to --chloride ($CaCl_2$) bath,-- |

In the Claims

| | | | |
|---|---|---|---|
| Claim 2, | Column 24, | Line 61, | change "the halides comprising:" to --the metal halides comprising:-- |
| Claim 6, | Column 25, | Line 41, | change "metal coating; onto" to --metal coating onto-- |

Signed and Sealed this
Fourteenth Day of November, 2023

*Katherine Kelly Vidal*
Katherine Kelly Vidal
*Director of the United States Patent and Trademark Office*